(12) United States Patent
Armbruster et al.

(10) Patent No.: US 7,048,324 B2
(45) Date of Patent: May 23, 2006

(54) DOOR FOR A MOTOR VEHICLE

(75) Inventors: Reiner Armbruster, Muehlacker (DE); Andre Scholz, Wiernsheim (DE); Jens Zimmer, Leonberg (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 55 days.

(21) Appl. No.: 10/892,242

(22) Filed: Jul. 16, 2004

(65) Prior Publication Data

US 2005/0046228 A1    Mar. 3, 2005

(30) Foreign Application Priority Data

Aug. 27, 2003 (DE) ................ 103 39 306

(51) Int. Cl.
*B60J 5/00* (2006.01)
(52) U.S. Cl. ................... 296/146.6; 49/502
(58) Field of Classification Search ............ 296/146.6, 296/187.12, 146.5
See application file for complete search history.

(56) References Cited

U.S. PATENT DOCUMENTS

| | | | | |
|---|---|---|---|---|
| 4,860,496 | A | * | 8/1989 | Hellriegel ............... 49/502 |
| 5,404,690 | A | | 4/1995 | Hanf |
| 5,417,470 | A | * | 5/1995 | Holt ................. 296/146.6 |
| 5,544,930 | A | * | 8/1996 | Stedman ............. 296/146.6 |
| 5,599,057 | A | * | 2/1997 | Hirahara et al. ....... 296/146.6 |
| 5,755,484 | A | | 5/1998 | Chou et al. |
| 6,135,537 | A | * | 10/2000 | Giddons ............. 296/146.6 |
| 6,170,199 | B1 | * | 1/2001 | Stenzel et al. ............ 49/502 |
| 6,192,632 | B1 | * | 2/2001 | Medebach et al. ......... 49/502 |
| 6,196,619 | B1 | * | 3/2001 | Townsend et al. ...... 296/146.6 |
| 6,205,714 | B1 | * | 3/2001 | Staser et al. .......... 296/146.6 |
| 6,220,652 | B1 | * | 4/2001 | Browne et al. ........ 296/146.6 |
| 6,416,114 | B1 | * | 7/2002 | Topker et al. ......... 296/146.6 |
| 6,659,537 | B1 | * | 12/2003 | Moriyama et al. ...... 296/146.6 |
| 6,846,033 | B1 | * | 1/2005 | Chu et al. ............ 296/146.6 |
| 2002/0171260 | A1 | | 11/2002 | Schneider |
| 2004/0080179 | A1 | * | 4/2004 | Okazaki et al. ........ 296/146.6 |
| 2005/0046227 | A1 | * | 3/2005 | White et al. .......... 296/146.6 |
| 2005/0121941 | A1 | * | 6/2005 | Omori et al. .......... 296/146.6 |

FOREIGN PATENT DOCUMENTS

| | | |
|---|---|---|
| DE | 2934278 A1 | 3/1981 |
| DE | 19755935 A1 | 6/1998 |
| DE | 19937000 A1 | 2/2001 |
| GB | 2101535 A | 1/1983 |

OTHER PUBLICATIONS

Partial English translation of German office action dated Mar. 25, 2004 in German application 103 39 306.4.

* cited by examiner

*Primary Examiner*—Kiran B. Patel
(74) *Attorney, Agent, or Firm*—Crowell & Moring LLP

(57) ABSTRACT

A door suitable for a motor vehicle is inserted in a recess of a body and includes a door body braced on upright columns of the body. The door body has an internal member and an external member and possesses frame elements bordering on the columns between which an impact protection device extends. In order to optimize this door, the external element connected to the internal element interacts with the impact protection device on an interior between the frame elements of the door body by way of a support apparatus.

25 Claims, 3 Drawing Sheets

DOOR FOR A MOTOR VEHICLE

This application claims the priority of German application 103 39 306.4, filed Aug. 27, 2003, the disclosure of which is expressly incorporated by reference herein.

BACKGROUND AND SUMMARY OF THE INVENTION

The present invention concerns a door for a motor vehicle which is inserted into a recess of a body and which includes a door body braced on upright columns of the body, with the door body including an internal member, an external member, frames bordering on the columns, an impact protection device extending between the columns, and a support apparatus.

A door of the type mentioned above known from prior British document GB 2 101 535 A has a door body which is formed by an internal member and an external member. An impact protection device extends between frames of the door body running upright adjacent to a door column and a lock column. The impact protection device has two impact carriers running at a distance from each other and oriented in the longitudinal direction of the door, which are only connected to the internal member of the door body.

German document DE 29 34 278 A1 addresses a door for a motor vehicle in which an external member of a door body is made of plastic. The external member accommodating some basic attaching parts of the door is constructed in a self-supporting manner by means of ribbings on its interior. The interior is covered by means of an internal member.

One object of this invention is to create a door for a motor vehicle in which the door is provided with an impact protection device and in which a door body, including an internal member and an external member, is improved in connection with the impact protection device with regard to shock absorption.

According to the invention, this object is accomplished by providing an external member which is connected to the internal member by the support apparatus and which interacts with the impact protection device. Further features of the invention are defined by the dependent claims.

Advantages chiefly attained by the invention are that the interaction of the impact protection device fastened to the internal member with the support apparatus installed on the exterior of the door body leads to exemplary shock absorption properties of the door. Moreover, the support apparatus is simple in construction and can be integrated into the door body through the use of reasonable means. An especially functional construction of the door is attained when the internal member and the external member of the door body are made of high strength non-metallic material or carbon fiber-reinforced plastic and the impact protection device, or at least parts thereof, are made of metal. Metal is likewise used for the support apparatus. With this choice of materials, glue is chiefly suitable for connecting the support apparatus to the internal member of the door body.

BRIEF DESCRIPTION OF THE DRAWINGS

An embodiment of the invention is explained in greater detail below by means of the drawings.

DETAILED DESCRIPTION OF THE INVENTION

Figure 1:
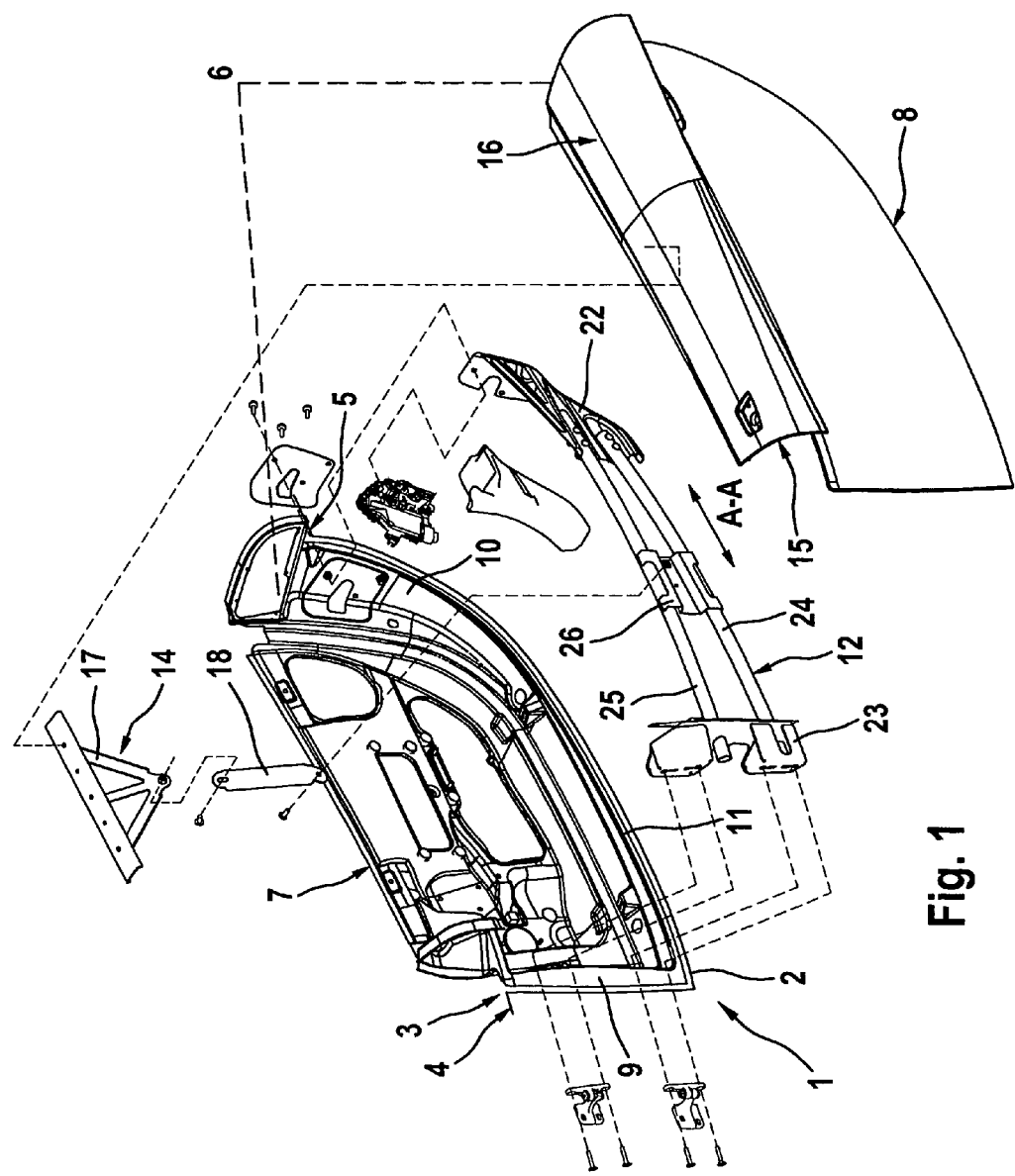
FIG. 1 is an exploded view of the door according to the invention.
Figure 2:
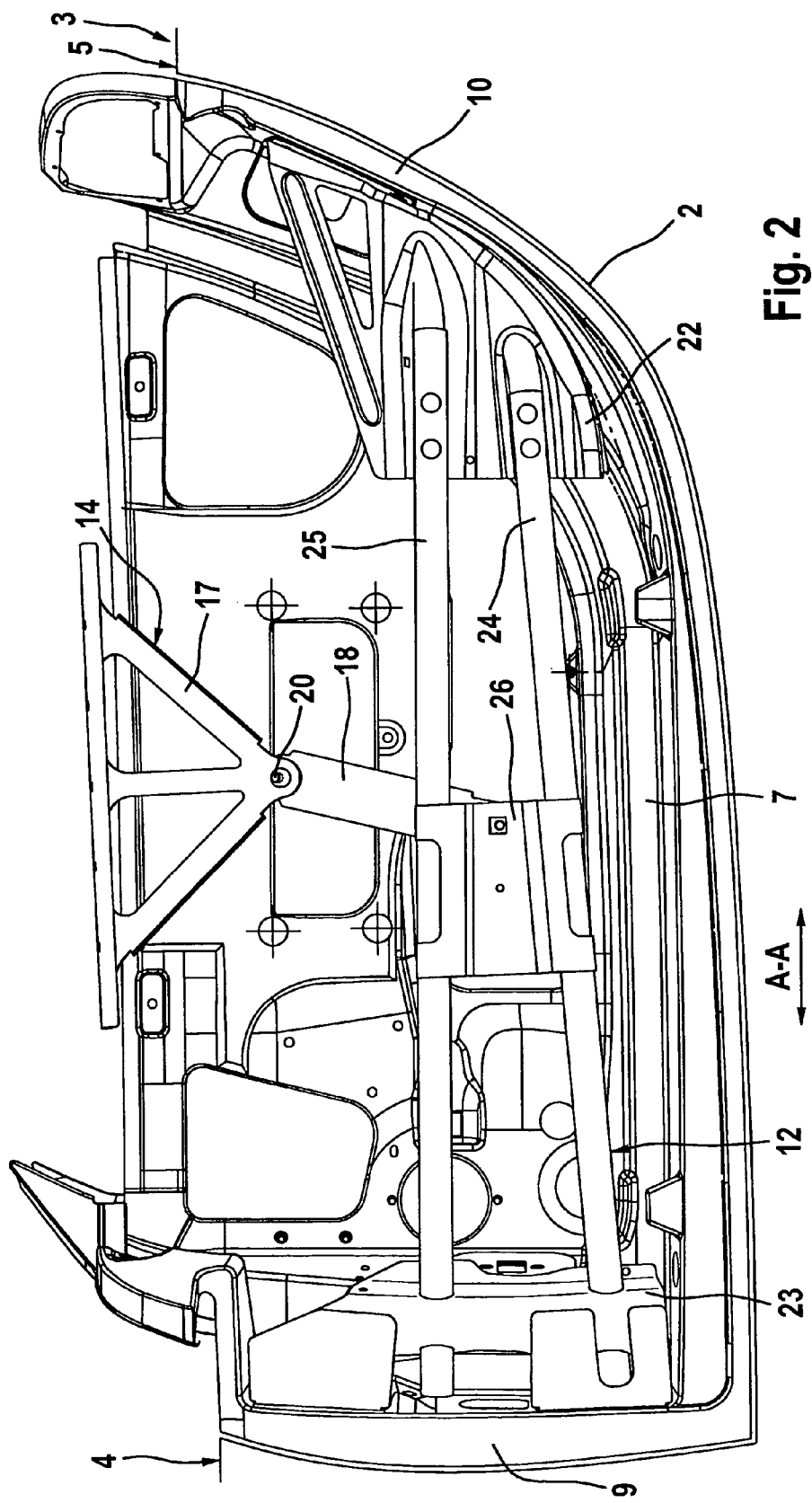
FIG. 2 is a side view of the door from the outside.

A door 1 for a motor vehicle (not shown in greater detail) is inserted into an opening 2 of a body 3 and includes a door body 6 (FIGS. 1 and 2) braced on upright columns 4 and 5 (column 4 is a hinge column, column 5 a lock column). The door body 6 is formed by an internal member 7 and an external member 8, and abuts, for example, against columns 4 and 5 by means of frames 9 and 10 provided on the internal member 7. The internal member 7 and the external member 8 are made of non-metallic materials or carbon fiber-reinforced plastic and are joined together along a flange 11 by gluing. An impact protection device 12 constructed in the form of a support extends in the longitudinal direction A—A of the motor vehicle or the door 1.

A support apparatus 14 is arranged on the interior 13 of the external member 8 between frames 9 and 10 of the door body that interacts with the impact protection device 12. For this purpose, the external member 8 is provided with a sill 16 having an approximately horizontally running wall 15 from which the support apparatus 14 extends to the impact protection device 12. The support apparatus 14 has a support bracket 17 guided away from the wall 15 of the sill 16 and a support arm 18 operating between support bracket 17 and impact protection device 12. Both are made of metal, but it is also conceivable to manufacture them of high strength non-metallic material. The support bracket 17 is provided with a bend 19 lying on the wall 15 which is connected to the aforementioned wall 14 of the sill 16 by gluing. The support bracket 17 tapers in a wedge-like manner from the bend 19, that is, it possesses the form of a triangle. In addition, the support arm 18 is connected to the support bracket 17 and the impact protection device 12 by interposition of screws 20 and 21.

The impact protection device 12 has a first bracket 22 and a second bracket 23 adjacent to frames 9 and 10 of the door body 6. Bracing elements 24 and 25 constructed in the form of pipes extend between these brackets 22 and 23 which run vertically at a distance from each other. The bracing elements 24 and 25 are connected to a retaining plate 26 in a median region between the brackets 22 and 23, whereby the support arm 18 of the support apparatus 14 engages with said retaining plate 26. The brackets 22 and 23 of the impact protection device 12 are fastened by screwing, gluing or the like to frames 9 and 10 of the internal member 7.

Figure 3:
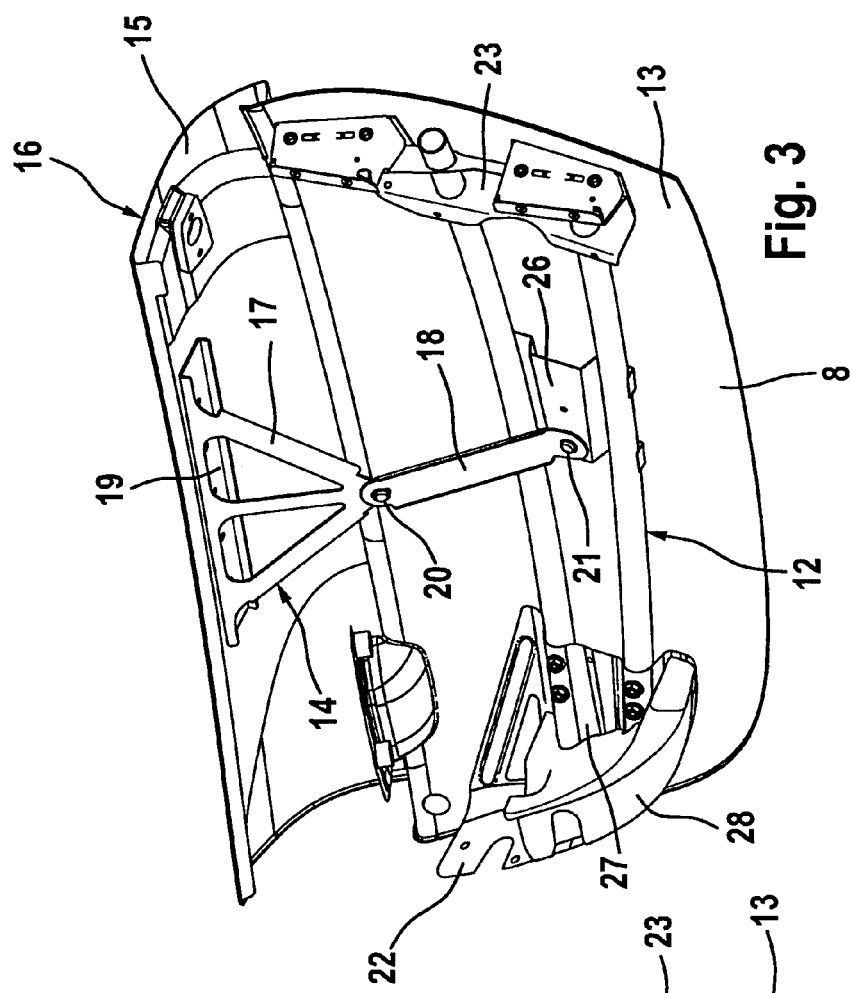
FIG. 3 is a three-quarters view of the interior of the door from the front.
Figure 4:
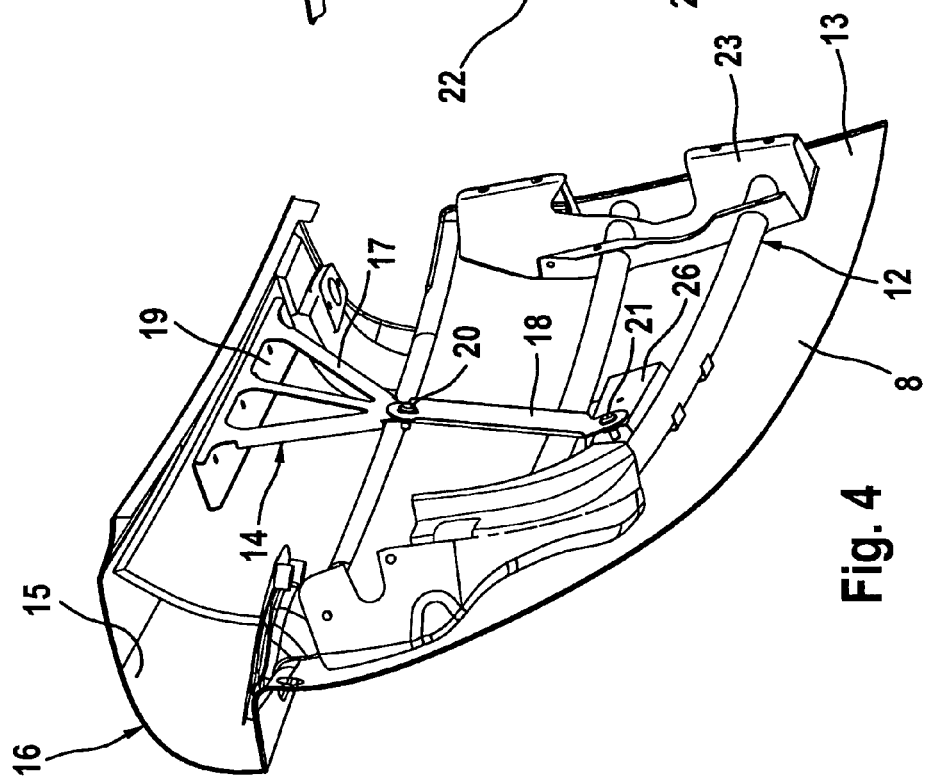
FIG. 4 is a three-quarters view of the interior of the door from the back.

It is clear from FIG. 3 that the bracket 22 is provided with a support element 28 of foamed plastic (FIG. 3) on a side 27 turned toward the internal member 7, and that the support element 28 is effective in connection with a defined shock action upon the impact protection device 12.

In the event of an accident shock acting upon the door 1, the impact protection device 12 held on the internal member of the door body 6 absorbs the forces arising in this connection. As a result, energy, among other things, is absorbed on the columns 4 and 5 bounding on the door 1 due to deformability. At the same time, the support apparatus 14 guarantees that the external member 8 of the door 1 retains a position in connection with the impact protection device 12 that supports selective shock energy absorption.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A door for a motor vehicle which is adapted for insertion into a recess of a body and including a door body braced on upright columns of the body, said door body comprising:
    an internal member,
    an external member,
    frames bordering on the columns,
    an impact protection device extending between the columns, and
    a support apparatus,
    wherein the external member is connected to the internal member by the support apparatus and interacts with the impact protection device.

2. The door according to claim 1, wherein the support apparatus runs from a sill of the external member up to the impact protection device.

3. The door according to claim 2, wherein the support apparatus has a support bracket guided away from the sill and a support arm operating between the support bracket and the impact protection device.

4. The door according to claim 3, wherein the support bracket is provided with a bend lying on the sill, and wherein the bend and the sill are connected to each other by gluing.

5. The door according to claim 3, wherein the support bracket tapers in a wedge-like manner toward the support arm.

6. The door according to claim 5, wherein the support arm is connected to the support bracket by screws.

7. The door according to claim 1, wherein the impact protection device has a first bracket and a second bracket adjacent to the frames of the door body, and wherein bracing elements are arranged between the brackets and extend at a distance from each other.

8. The door according to claim 7, wherein the impact protection device is fastened to the frames of the door body by brackets.

9. The door according to claim 3, wherein the impact protection device has a first bracket and a second bracket adjacent to the frames of the door body, and wherein bracing elements are arranged between the brackets and extend at a distance from each other.

10. The door according to claim 9, wherein the bracing elements are connected by a retaining plate of the impact protection device between the brackets.

11. The door according to claim 10, wherein the support arm engages with the retaining plate.

12. The door according to claim 1, wherein the internal member and the external member consist of high strength non-metallic material or carbon fiber reinforced plastic and the impact protection device is at least partially made of metal.

13. The door according to claim 7, wherein the bracing elements are pipes.

14. The door according to claim 2, wherein the internal member and the external member consist of high strength non-metallic material or carbon fiber reinforced plastic and the impact protection device is at least partially made of metal.

15. The door according to claim 3, wherein the internal member and the external member consist of high strength non-metallic material or carbon fiber reinforced plastic and the impact protection device is at least partially made of metal.

16. The door according to claim 4, wherein the internal member and the external member consist of high strength non-metallic material or carbon fiber reinforced plastic and the impact protection device is at least partially made of metal.

17. The door according to claim 5, wherein the internal member and the external member consist of high strength non-metallic material or carbon fiber reinforced plastic and the impact protection device is at least partially made of metal.

18. The door according to claim 6, wherein the internal member and the external member consist of high strength non-metallic material or carbon fiber reinforced plastic and the impact protection device is at least partially made of metal.

19. The door according to claim 7, wherein the internal member and the external member consist of high strength non-metallic material or carbon fiber reinforced plastic and the impact protection device is at least partially made of metal.

20. The door according to claim 8, wherein the internal member and the external member consist of high strength non-metallic material or carbon fiber reinforced plastic and the impact protection device is at least partially made of metal.

21. The door according to claim 9, wherein the internal member and the external member consist of high strength non-metallic material or carbon fiber reinforced plastic and the impact protection device is at least partially made of metal.

22. The door according to claim 10, wherein the internal member and the external member consist of high strength non-metallic material or carbon fiber reinforced plastic and the impact protection device is at least partially made of metal.

23. The door according to claim 11, wherein the internal member and the external member consist of high strength non-metallic material or carbon fiber reinforced plastic and the impact protection device is at least partially made of metal.

24. A door body for a door of a motor vehicle which is adapted for insertion into a recess of a body and which is braced on upright columns of the body, said door body comprising:
    an internal member,
    an external member,
    frames bordering on the columns,
    an impact protection device, extending between the columns, and
    a support apparatus,
    wherein the external member is connected to the internal member by the support apparatus and interacts with the impact protection device.

25. The door body according to claim 24, wherein the support apparatus runs from a sill of the external member up to the impact protection device.

* * * * *